(12) United States Patent
Kanekawa et al.

(10) Patent No.: US 6,389,063 B1
(45) Date of Patent: May 14, 2002

(54) SIGNAL TRANSMISSION APPARATUS USING AN ISOLATOR, MODEM, AND INFORMATION PROCESSOR

(75) Inventors: Nobuyasu Kanekawa, Hitachi; Kazuo Kato, Naka-gun; Yasuyuki Kojima, Hitachi; Seigoh Yukitake, Oume, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/182,219

(22) Filed: Oct. 30, 1998

(30) Foreign Application Priority Data

Oct. 31, 1997 (JP) .............................. 9-299916

(51) Int. Cl.[7] .............................. H04B 1/38; H03F 3/38
(52) U.S. Cl. ......................................... 375/222; 330/10
(58) Field of Search ................................. 375/222, 220, 375/257, 244, 288, 377; 330/10, 251, 129; 333/24 R, 160; 379/93.01, 27

(56) References Cited

U.S. PATENT DOCUMENTS

| | | | |
|---|---|---|---|
| 4,748,419 A | | 5/1988 | Somerville .................... 330/10 |
| 5,627,092 A | * | 5/1997 | Alsmeier et al. ............ 438/152 |
| 6,020,793 A | * | 2/2000 | Makino et al. ............... 333/1.1 |
| 6,225,927 B1 | * | 5/2001 | Scott et al. .................. 341/110 |

* cited by examiner

Primary Examiner—Chi Pham
Assistant Examiner—Khai Tran
(74) Attorney, Agent, or Firm—Antonelli, Terry, Stout & Kraus, LLP

(57) ABSTRACT

The signal x to be transmitted is converted to the redundant code f(x) by the redundancy coder 6 and transmitted via the isolating capacitor 2 of the isolator 50. When the signal f(x) redundancy-coded and transmitted is the coded word f(xi), the decoder 7 outputs xi which is inferred as an equivalent original signal and when an error occurs and the signal f(x) does not match the coded word f(xi), the decoder 7 corrects the error and outputs xi which is inferred as an original signal.

9 Claims, 16 Drawing Sheets

PLAN VIEW

CROSS SECTIONAL VIEW (BETWEEN A AND A')

SIGNAL TRANSMISSION APPARATUS USING AN ISOLATOR, MODEM, AND INFORMATION PROCESSOR

BACKGROUND OF THE INVENTION

1. Field of the Invention

The present invention relates to an insulating coupler or an insulating amplifier (hereinafter, referred to as an isolator) for transmitting an electric signal using a capacitor formed on a semiconductor device and particularly a highly dielectric capacitor which does not break down the device and prevents a dangerous voltage from passing the secondary side even if a high voltage is applied.

2. Description of Related Art

To protect a highly public network equipment and a terminal, the communication field requires high isolation for the boundary between the network and the terminal and a miniature communication transformer having high isolation has been used. However, as personal terminals have been spread and developed, further miniaturization and lightweight have been required as a portable terminal, and a problem arises that a miniaturization request is not sufficiently satisfied by improvement of the material and structure used for a transformer, and application of an isolator has been examined.

In use such as measurement or medical treatment, there is a case that it is necessary to isolate the signal detection unit and the signal processing unit from each other such as a sensor and signal processing circuit and an isolator is known as an isolation means in such a case.

As an object of miniaturization, high reliability, and low price of an isolator, a capacitive isolator has been developed. As a highly dielectric capacitor art as an individual part constituting an insulating barrier, a ceramic capacitor for power or surge protection is known and a signal transmission circuit block using it is called a capacitive insulating amplifier or a capacitive insulating coupler and has been used since 1970.

In Japanese Patent Application Laid-Open 62-260408, a pulse signal modulated from an analog signal is transmitted to the secondary side isolated by a capacitor, and an analog signal is regenerated by decoding, and isolation of transmission of the analog signal is realized.

The aforementioned prior art is an excellent method which can make the capacity of the isolation capacitor smaller such as 3 pF because it modulates an analog signal at a higher frequency. However, it is necessary to further consider prevention of occurrence of an error due to electrical noise when a signal is to be transmitted via the isolation capacitor. The prior art is easily affected by electrical noise in essence because it analogously modulates an analog signal such as PWM (pulse width modulation) or FM (frequency modulation) and transmits it. The system described in Japanese Patent Application 62-260408 has a possibility of transmission of not only an analog signal but also a digital signal which is mostly used in the recent signal processing. Therefore, transmission of a digital signal in which noise can be easily removed by the signal processing is specified and a method for preventing a transmission error due to electrical noise will be examined.

In the case of transmission of an analog signal, the effect of electrical noise appears as an error of the analog value proportional to the intensity of electrical noise. In transmission of a digital signal, the effect will not appear at all before the intensity of electrical noise exceeds a threshold value. However, when the intensity of noise exceeds a threshold value, the transmission is affected. When each bit has an individual meaning, even if any bit is incorrectly transmitted due to electrical noise, it is greatly affected. In the case of data whose analog value is converted to a digital value, the bits on the MSB (most significant bit) side are generally affected more greatly. As mentioned above, especially in transmission of a digital signal, when electrical noise more than a threshold value is generated, the effect is suddenly increased and cannot be ignored in practical use. Particularly isolation is often used for long distance signal transmission or in a device installed out of doors in which a lightning surge is expected, so that the frequency that the intensity of electrical noise due to the induced surge becomes higher than the level affecting transmission of a digital signal is high.

To eliminate the effect of electrical noise during signal transmission, redundant codes having a long Hamming distance between codes such as error correcting codes or CRCs (cyclic redundancy code) have been conventionally used widely. To make correction of a 1-bit error possible, it is necessary to set the Hamming distance between the redundant codes to 3 or more. There is a tendency that the decoding process such as redundancy coding and error correction becomes complicated.

SUMMARY OF THE INVENTION

An object of the present invention is to provide an information transmission system via an isolating capacitor having little error effect due to electrical noise.

Another object of the present invention is to provide a transmission system using redundant codes which can correct an error at a smaller Hamming distance and can be simply realized.

The first and second objects are accomplished by the following constitution or method.

Firstly, a signal transmission apparatus comprises a redundancy coder for redundancy-coding an input signal, a decoder for decoding a signal redundancy-coded by the redundancy coder, and an isolator for electrically insulating the redundancy coder and decoder and also transmitting information from the redundancy coder to the decoder, and the primary side (the transmission source side from the isolator) redundancy-codes a signal (error detection and correction code) and transmits it via the isolator, and the secondary side (the transmission destination side from the isolator) detects and corrects an error during decoding. By doing this, a signal is redundancy-coded (error detection and correction code) and transmitted. Therefore, by redundancy-coding (error detection and correction code) and transmitting, an error is detected and corrected during decoding, so that a transmission error due to electrical noise can be eliminated.

Secondarily, when the code transmitted during decoding by the decoder on the secondary side is a non-coded word (a code incoherent as a redundant code), the transmission apparatus is constituted so that the already decoded signal, that is, the preceding output value is held. By doing this, by a redundant code at a smaller Hamming distance, signal transmission with little error effect is made possible. Namely, when the transmitted code is a non-coded word, by holding the preceding output value, by the redundant code at the Hamming distance 2 between the codes, pseudo-error correction is made possible. When an error occurs at the change point of a signal to be transmitted, a delay occurs in the change in the transmitted signal by one interval of signal transmission. However, if the signal transmission interval is shortened, the delay in signal transmission when an error occurs can be minimized.

Thirdly, a signal transmission apparatus comprises a modulator for modulating an input signal in synchronization with the clock signal, a demodulator for regenerating the input signal by synchronizing the signal modulated by the modulator with the clock, and an isolator for electrically insulating the modulator and demodulator and transmitting information from the modulator to the demodulator. By doing this, the modulated input signal is transmitted via the isolator and demodulated, so that electrical noise can be eliminated. Furthermore, when the clock signal inputted to the demodulator is sent to the modulator via the isolator and the input signal is modulated in synchronization with the clock signal, the effect of electrical noise on demodulation of the modulated signal can be extensively reduced without being affected by electrical noise. Therefore, the effect of synchronous detection having the effect of electrical noise elimination can be produced at its maximum.

Fourthly, a signal transmission apparatus comprises a modulator for modulating an input signal in synchronization with the clock signal, a demodulator for sampling a signal obtained by modulating the signal modulated by the modulator at the leading edge and trailing edge of the clock, and an isolator for electrically insulating the modulator and demodulator and transmitting the modulated signal from the modulator to the demodulator. By doing this, modulation and demodulation can be realized by a digital process, so that a circuit performing a sure operation can be easily obtained. Furthermore, when the clock signal inputted to the demodulator is sent to the modulator via the isolator and the input signal is modulated in synchronization with the clock signal, the effect of electrical noise on demodulation of the modulated signal can be extensively reduced without being affected by electrical noise.

Fifthly, a signal transmission apparatus comprises a signal output device for outputting a signal in synchronization with the clock signal, a signal receiving device for receiving the signal from the signal output device by the clock signal only for a specified period, and an isolator for electrically insulating the signal output device and signal receiving device and also transmitting a signal from the signal output device to the signal receiving device, and the primary side outputs a signal to be transmitted in synchronization with the clock signal, and the secondary side operates the receiving function only at the timing that the transmitted signal is transferred in synchronization with the clock signal. According to this, the function on the secondary side for receiving the transmitted signal operates only at the timing that the transmitted signal is transferred in synchronization with the clock, so that the effect of electrical noise occurring at random without correlation with the clock can be eliminated.

Furthermore, when a modem is constituted using the signal transmission apparatuses shown in the first to fifth examples, a modem for eliminating the effect of electrical noise can be provided.

Furthermore, when the signal transmission apparatuses shown in the first to fifth examples are applied to an information processor such as a personal computer, an information processor having a built-in modem eliminating the effect of external electrical noise can be provided and when a signal outputted from the signal transmission apparatus is processed by a microprocessor which is a personal computer, the personal computer can be miniaturized.

DESCRIPTION OF THE PREFERRED EMBODIMENTS

The embodiments of the present invention will be explained hereunder with reference to the accompanying drawings.

Figure 1:
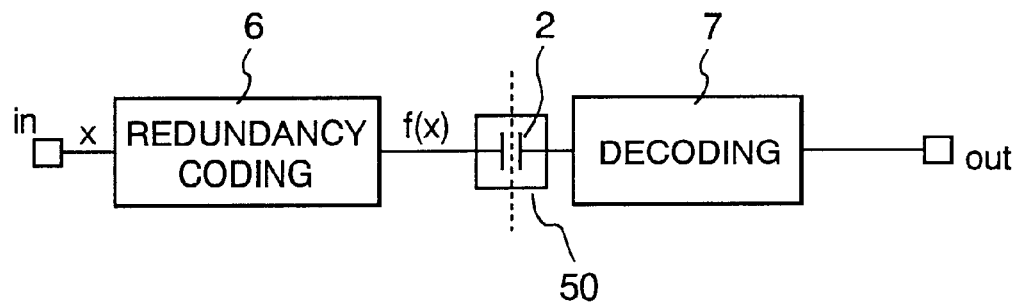
FIG. 1 a block diagram showing a constitution of redundancy-coding and transmission in the first embodiment.

FIG. 1 shows a constitution in the first embodiment that the primary side (the transmission source side from the isolator) redundancy-codes (error detection and detection code) a signal and transmits it via the isolator and the secondary side (the transmission destination side from the isolator) detects and corrects an error when it decodes the signal. A signal x to be transmitted is converted to a redundant code f(x) by a redundancy coder 6 and transmitted to a decoder 7 via an isolating capacitor 2 of an isolator 50. In this case, the isolator 50 electrically insulates the redundancy coder 6 and the decoder 7 and transmits the redundant code f(x) converted by the redundancy coder 6 to the decoder 7 and the isolating capacitor 2 is a capacitor as a component for executing electrical insulation and transmission of the redundant code f(x). Hereinafter, the isolating capacitor will be used in the same meaning.

When the redundancy-coded and transmitted signal f(x) matches the coded word f(xi), the decoder 7 outputs xi which is inferred as an equivalent original signal and when an error occurs and the signal f(x) does not match the coded word f(xi), the decoder 7 corrects the error and outputs xi which is inferred as an original signal. A case that the signal f(x) matches the coded word (is the coded word) means a case that for example, if the original data is 01010101 when odd parity is to be handled, the parity is 1, and "01010101, 1" is a coded word, and there are an odd number of 1s. A case that the signal f(x) does not match the coded word (is a non-coded word) means a case that there are an even number of 1s. In other words, when the obtained code is a code following the coding rules, it is a coded word. When the obtained code does not follow the coding rules, it is a non-coded word. As redundant codes (error detection and correction codes), there are the SECDED (single error correction, double error detection) used for a memory or others, CRC (cyclic redundant code) used for signal transmission, and read Solomon code in addition and also in this case, when the obtained code is a code following the coding rules, it is a coded word and when the obtained code does not follow the coding rules, it is a non-coded word. Hereinafter, the coded word and non-coded word will be used in the same meanings.

As mentioned above, according to the first embodiment, a transmission error caused by the effect of electrical noise when a signal is to be transmitted via the isolating capacitor 2 can be eliminated. In the aforementioned embodiment, the isolator capacitively coupling the primary side and the secondary side using the isolating capacitor has been explained. Also in an isolator inductively coupling the primary side and the secondary side using a transformer or an isolator optically coupling the primary side and the secondary side using a photocoupler, a transmission error caused by the effect of electrical noise can be eliminated in the same way.

Figure 2:
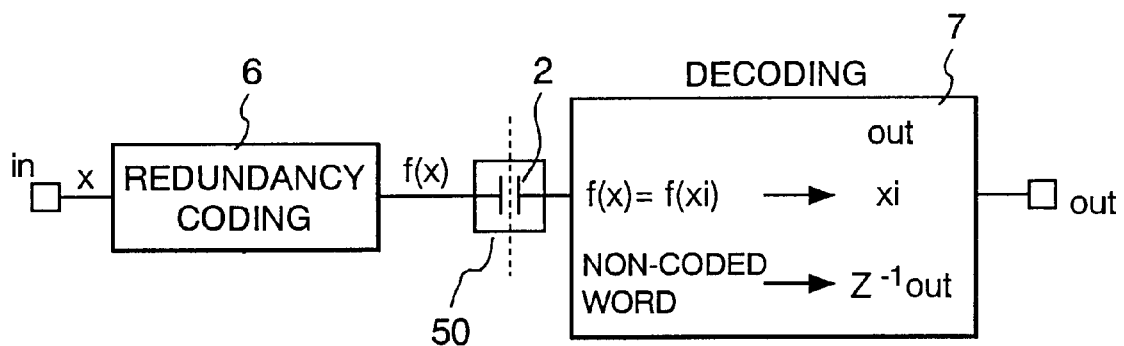
FIG. 2 is a block diagram showing another constitution of redundancy-coding and transmission in the second embodiment.

FIG. 2 shows a constitution in the second embodiment that when a code transmitted so as to decode on the secondary side is a non-coded word, the preceding output value is held. The signal x to be transmitted is converted to the redundant code f(x) by the redundancy coder 6 and transmitted via the isolating capacitor 2 of the isolator 50. When the redundancy-coded and transmitted signal f(x) is the coded word f(xi), the decoder 7 outputs xi which is inferred as an equivalent original signal and when the signal f(x) is not equivalent to any coded word f(xi) (when it is a non-coded word), the decoder 7 holds the preceding output value "out" and outputs the preceding output value $(Z^-1)$.

According to this, when a signal is retransmitted when an error occurs using a redundant code at a smaller Hamming distance for which only error correction is possible, a transmission error can be eliminated. For example, in the SECDED code which can independently correct an error, not only an extra redundant bit is necessary but also a comparatively large scale logical circuit is necessary so as to decode a code and generate a syndrome for error correction. However, if parity capable of executing only error correction is used, very few redundant bits are enough and moreover the circuit can be simplified extensively. Even if the isolator in the second embodiment inductively couples the primary side and the secondary side using a transformer or optically couples the primary side and the secondary side using a photocoupler, a transmission error can be eliminated in the same way.

Figure 3:
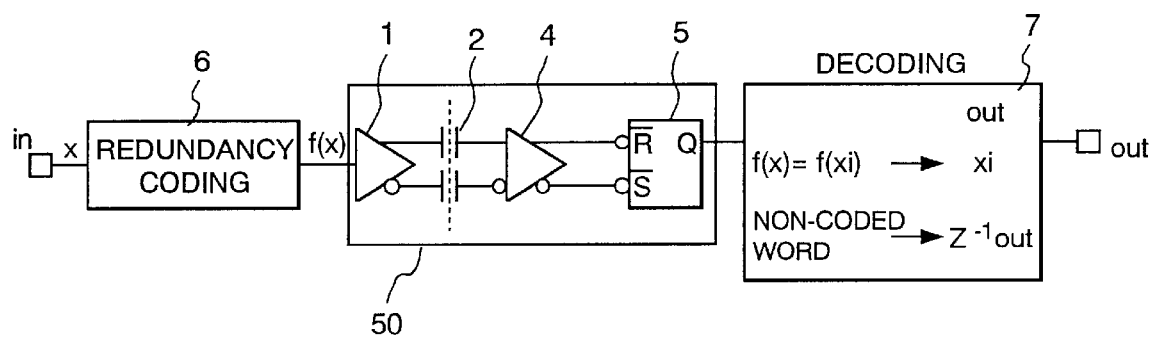
FIG. 3 is a block diagram concretely showing a constitution of the isolator in the constitution shown in FIG. 2

FIG. 3 shows the constitution of FIG. 2 together with a detailed constitution of the isolator 50. The redundant code f(x) coded according to the input signal x by the redundancy coder 6 is amplified by an amplifier 1 having a differential output of the isolator 50 and the differential output is transmitted to an amplifier 4 having a differential input and a differential output on the secondary side via the isolating capacitor 2. The positive and negative differential outputs of the amplifier 4 are inputted to the R and S input terminals of an RS flip-flop 5 respectively. The RS flip-flop 5 is a regenerative circuit for reproducing the input signal f(x) to the isolator 50 in a sense and the output of the regenerative circuit is inputted to the decoder 7. The isolator 50 shown in FIG. 3 is also applied to the isolator 50 shown in FIG. 1.

Figure 4:
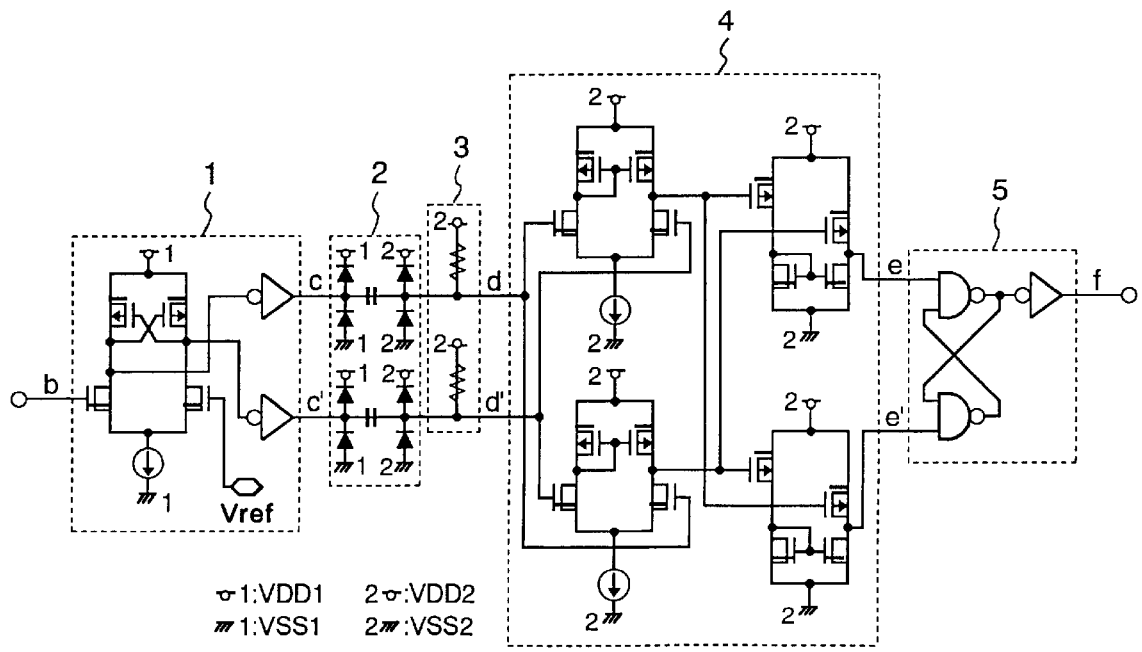
FIG. 4 is a circuit diagram showing a detailed constitution of the isolator.
Figure 5:
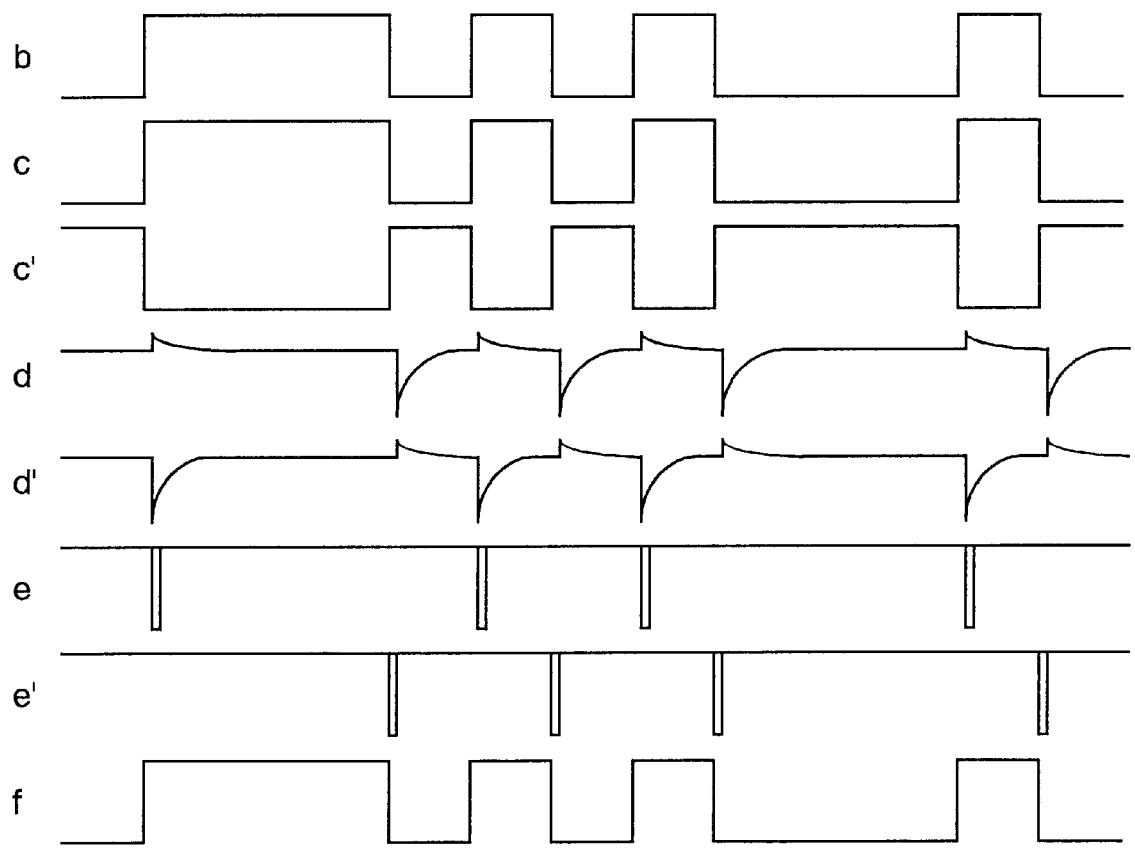
FIG. 5 is a wave form chart showing the signal waveform of each unit of the isolator.

FIG. 4 shows a concrete circuit diagram of the isolator 50 shown in FIG. 3. FIG. 5 shows operation waveforms of the circuit shown in FIG. 4. The concrete circuit operation of the isolator 50 will be explained by referring to FIGS. 4 and 5. Numeral 1 indicates a differential amplifier for amplifying an input signal b and outputting complementary differential outputs c and c'. The first stage comprises a differential amplifier of CMOS and outputs the comparison result of the reference voltage Vref and the input signal b as a complementary differential signal. The driver at the next stage (drive stage) comprises a CMOS inverter and outputs differential output c and c' signals using it. An isolating capacitor 2 is an insulating barrier having dielectric strength between the primary side and the secondary side. At each terminal of the primary side and the secondary side, a reversely connected diode is installed between each terminal and the high potential power supply (VDD1 or VDD2) or the low potential power supply (VSS1 or VSS2) so as to absorb a surge due to noise. The insulating barrier itself comprises a highly dielectric capacitor formed inside the same semiconductor integrated device. Numeral 3 indicates a load resistor for constituting the differential circuit installed so as to output a differential waveform to the secondary side terminal by capacitive coupling from the primary side. The load resistor is installed so as to short-circuit between the high potential power supply VDD2 and the secondary side terminal. Therefore, the secondary side terminal is stationarily fixed to the potential of the high potential power supply VDD2 and when the primary side terminal transfers from the "High" level to the "Low" level, a spike-shaped differential signal is generated toward the "Low" level side.

The amplifier 4 is a transition detection circuit for inputting paired differential signals d and d', detecting the leading edge and trailing edge of the input signal b, and generating one-shot pulses e and e'. The input stage for receiving the paired differential signals d and d' uses a pair of CMOS differential amplifiers complementarily connected. An input signal is stationarily set on the same level, so that the load comprises a PMOS current mirror. Only when a potential difference is generated (the input signal b transfers) between the paired differential signals d and d', the CMOS differential amplifiers output a differential output signal for the potential difference (each CMOS differential amplifier outputs a single end output signal). Therefore, the outputs of the pair of CMOS differential amplifiers are stationarily set on the same level and hence it is necessary to design so that the level conversion circuit for PMOS input at the next stage will not output the intermediate level (level in the neighborhood of the logical threshold value of the gate at the next stage) when an input signal is set on the same level. For example, in this embodiment, the pulse demodulation circuit comprising the flip-flop at the next stage is received by the CMOS NAND gate, so that the gate width of the MOS of the level conversion circuit is designed so as to intentionally output the "High" level when the input is on the same level. The outputs e and e' of the amplifier 4 which is a transition detection circuit are stationarily on the "High" level and in correspondence with the transition of the input signal b, a one-shot pulse on the "Low" level is generated in one of them at the rising time and in the other at the falling time. The RS flip-flop 5 constitutes the pulse demodulation circuit for regenerating the input signal b on the secondary side by the output signals e and e' of the transition detection circuit 4 and outputting an output signal f. In this drawing, the flip-flop comprising two sets of CMOS-NAND gates and the pulse demodulation circuit comprising one set of CMOS inverter driver are shown. A means for resetting the flip-flop can be easily incorporated as required by those who are skilled in the art in the field of the present invention.

Figure 6A:
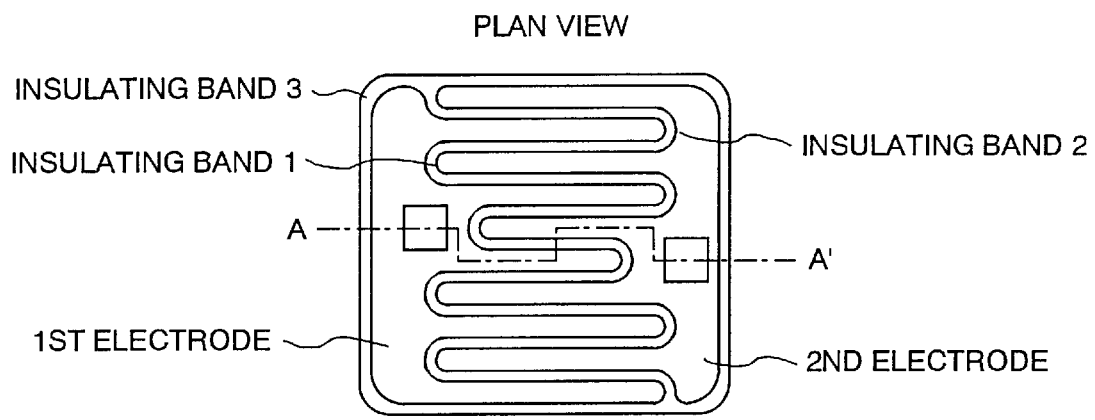
FIG. 6a is a schematic plan view showing a constitution of an isolating capacitor.
Figure 6B:
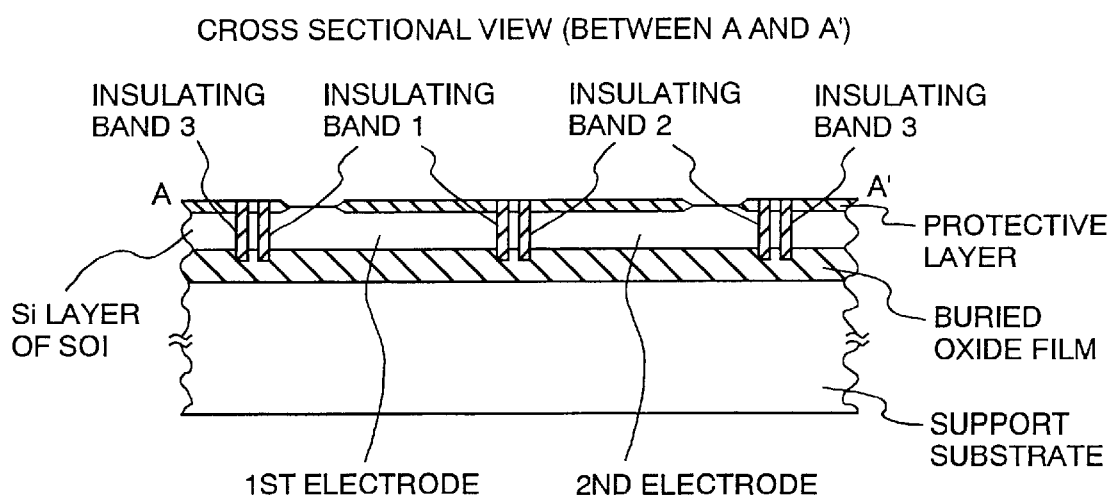
FIG. 6b is a sectional view along the lines A–A' of FIG. 6a showing a constitution of an isolating capacitor.

FIG. 6 shows the isolating capacitor 2 formed on a monolithic IC. (a) indicates a plan view and (b) indicates a cross sectional view. In this case, using a semiconductor wafer having an insulating layer as an inner layer, for example, an SOI (silicon on insulator) substrate, an insulating band having a function for coupling the primary side and secondary side as a capacitor which is an insulating barrier is formed. The insulating band is formed by digging a trench reaching the insulating layer internally layered (hereinafter, referred to as a buried oxide film) once and then embedding a silicon oxide film. A capacitor that the insulating layer is connected in series at two stages between a first electrode enclosed by an insulating band 1 and a second electrode enclosed by an insulating band 2 is formed. Furthermore, the capacitor portion is separated from the other peripheral circuit by an insulating band 3.

This isolating capacitor can be easily constituted by adding the trench process (trench digging and trench embedding) to the CMOS device process on the semiconductor wafer having an insulating layer as an inner layer.

Further expanded, needless to say, not only the isolating capacitor but also the redundancy coder, amplifier 1, amplifier 4, D flip-flop 5, and decoding function 7 can be structured on the same chip of the CMOS device process.

Figure 7:
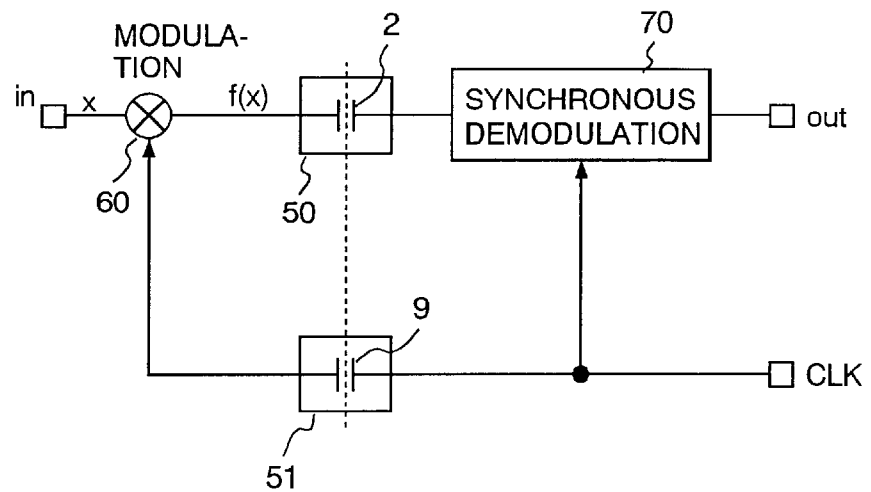
FIG. 7 is a block diagram showing a constitution of synchronous modulation, transmission, and synchronous demodulation in the third embodiment.
Figure 8:
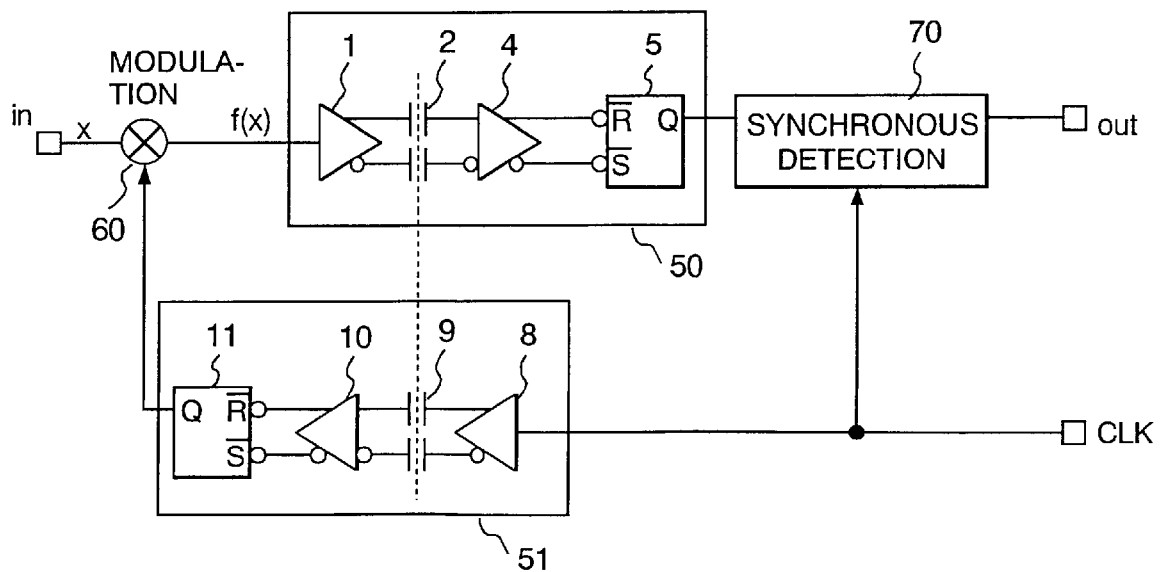
FIG. 8 is a block diagram concretely showing a constitution of the isolator in the constitution shown in FIG. 7.

FIG. 7 shows a constitution that when a signal is to be redundancy-coded, that is, modulated in the time region in the third embodiment, the secondary side generates a carrier and transmits the carrier to the primary side via the isolator and the primary side modulates the carrier transmitted from the secondary side and transmits it to the secondary side via the isolator. The drawing shows a constitution that the secondary side transmits the clock signal CLK which is a carrier to the primary side via an isolating capacitor 9 of an isolator 51 and the primary side modulates an input signal x by a modulator 60 and transmits it to the secondary side via an isolating capacitor 2 of an isolator 50 once again. The secondary side demodulates the input signal x in synchronization with the clock signal CLK by a synchronous demodulator 70 and reproduces and outputs it. FIG. 8 shows the portions of the isolators 50 and 51 in the constitution shown in FIG. 7 in detail. The signal f(x) obtained by coding the input signal x by the modulator 60 on the primary side is amplified by the amplifier 1 having a differential output in the same way as with FIG. 3 and the differential output is transmitted to the amplifier 4 having a differential input and differential output on the secondary side via the isolating capacitor 2. The positive and negative differential outputs of the amplifier 4 are inputted to the R and S input terminals of the RS flip-flop 5 respectively. The RS flip-flop 5 reproduces the input signal f(x) and the output is inputted to the synchronous demodulator 70. The clock signal CLK generated on the secondary side is amplified by an amplifier 8 having a differential output and the differential output is transmitted to an amplifier 10 having a differential input and differential output on the primary side via an isolating capacitor 9. The positive and negative differential outputs of the amplifier 10 are inputted to the R and S input terminals of the RS flip-flop 11 respectively. The RS flip-flop 11 reproduces the clock signal CLK generated on the secondary side and outputs it to the modulator 60. The detailed operation of the isolator 51 is the same as that explained in FIGS. 4 and 5. As mentioned above, according to the third embodiment, a transmission error generated by the effect of electric noise can be eliminated. Even if the isolator in the third embodiment inductively couples the primary side and the secondary side using a transformer or optically couples the primary side and the secondary side using a photocoupler, a transmission error can be eliminated in the same way.

Figure 9:
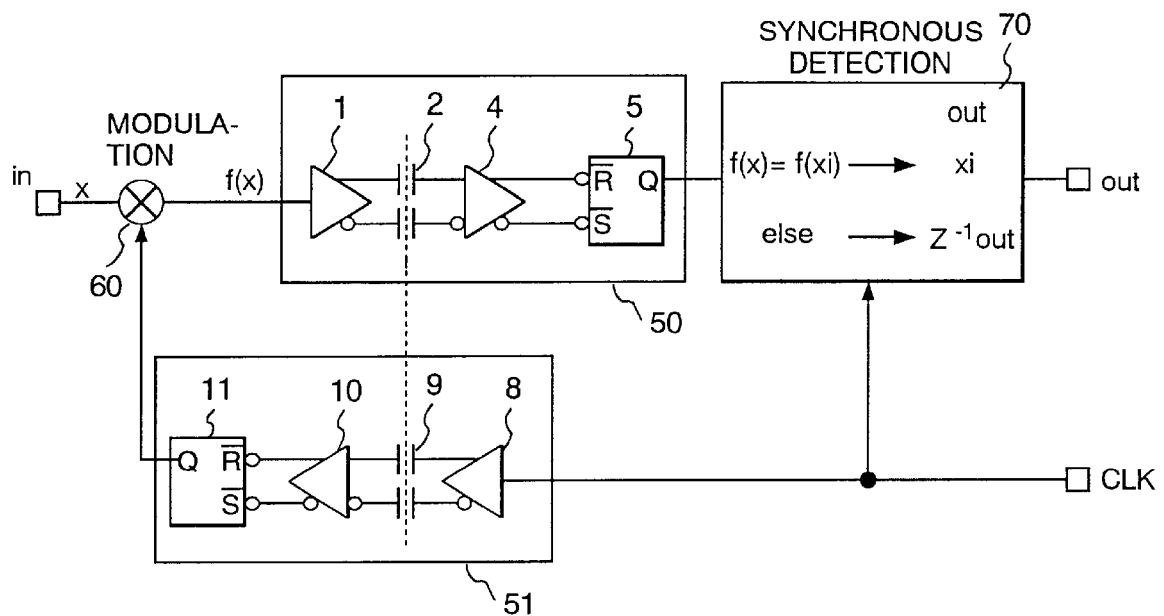
FIG. 9 is a block diagram showing a constitution when the second embodiment and the third embodiment are combined.

FIG. 9 shows a constitution when the second embodiment and the third embodiment are combined. Concretely, the redundant code f(x) obtained by coding the input signal x by the modulator 60 on the primary side is amplified by the amplifier 1 having a differential output in the same way as with FIG. 3 and the differential output is transmitted to the amplifier 4 having a differential input and differential output on the secondary side via the isolating capacitor 2. The positive and negative differential outputs of the amplifier 4 are inputted to the R and S input terminals of the RS flip-flop 5 respectively. The RS flip-flop 5 reproduces the signal f(x) and the output is inputted to the synchronous demodulator 70. When the transmitted signal f(x) is the coded word f(xi), the synchronous demodulator 70 outputs xi which is inferred as an equivalent original signal and when the signal f(x) is not equivalent to any coded word f(xi) (when it is a non-coded word), the synchronous demodulator 70 holds the preceding output value "out", that is, outputs $Z^{-1}$ out. Even in this case, the isolator may inductively couple the primary side and the secondary side using a transformer or optically couple the primary side and the secondary side using a photocoupler.

Figure 10:
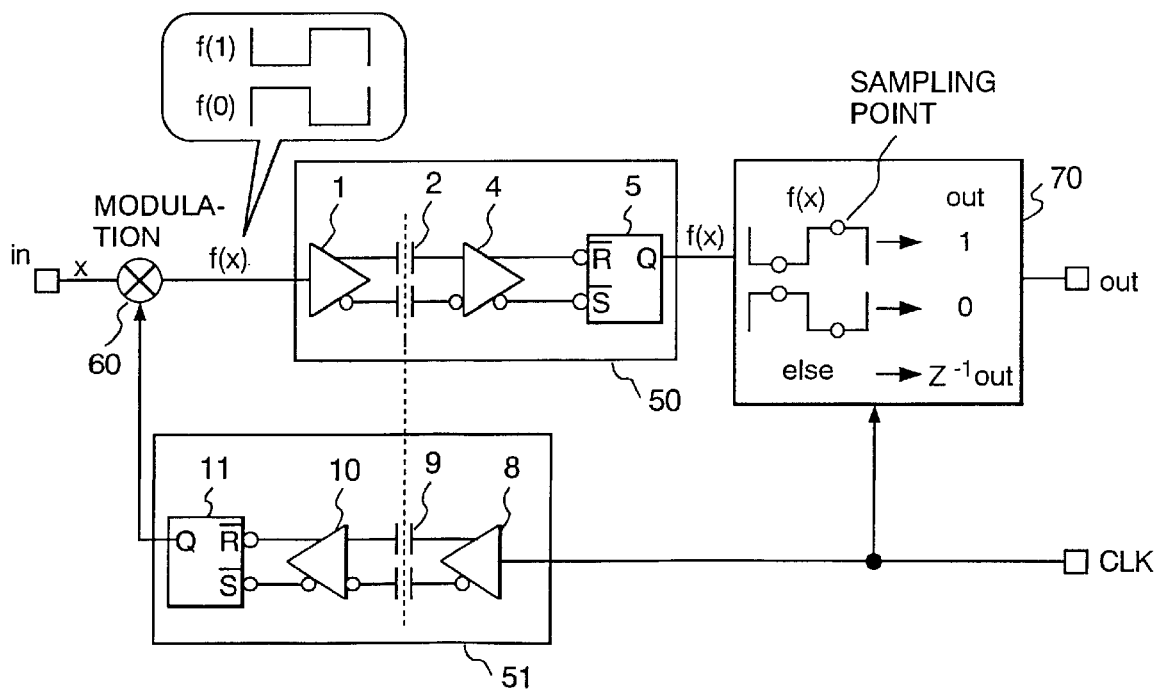
FIG. 10 is a block diagram showing a constitution of synchronous modulation, transmission, and synchronous demodulation for sampling by a clock signal in the fourth embodiment.
Figure 11:
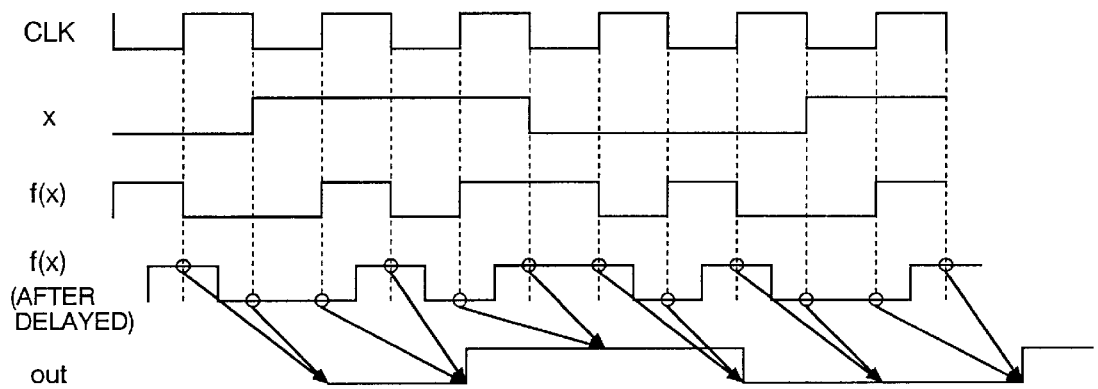
FIG. 11 is a wave form chart showing the signal waveform (in the normal state) of each unit in the constitution shown in FIG. 10.

FIG. 10 shows a constitution that the primary side modulates a carrier in phase by a signal to be transmitted in the fourth embodiment and the secondary side samples the transmitted signal at the leading and trailing edges of the carrier, detects the phase of the transmitted signal from the respective values, and obtains a target signal. The signal f(x) modulated in phase according to the input signal x by the modulator 60 on the primary side is amplified by the amplifier 1 having a differential output in the same way as with FIG. 3 and the differential output is transmitted to the amplifier 4 having a differential input and differential output on the secondary side via the isolating capacitor 2 of the isolator 50. The positive and negative differential outputs of the amplifier 4 are inputted to the R and S input terminals of the RS flip-flop 5 respectively. The RS flip-flop 5 reproduces the signal f(x) and the output is inputted to the synchronous demodulator 70. The synchronous demodulator 70 samples the signal f(x) at the leading edge and trailing edge of the clock signal CLK and discriminates the phase of the signal f(x). FIG. 11 shows the signal waveform of each unit. An example that when the input signal x is 1 ("High") as shown in FIGS. 10 and 11, the modulated signal f(x) is modulated from "Low" to "High" and when the input signal x is 0 ("Low"), the modulated signal f(x) is modulated from "High" to "Low" will be explained. In this case, when the sampled values of the signal f(x) transmitted at the leading edge and trailing edge of the clock CLK are "Low" and "High" respectively, the synchronous demodulator 70 outputs 1 ("High") as output out and when the sampled values are "High" and "Low", the synchronous demodulator 70 outputs 0 ("Low") as output out. In the other cases, the synchronous demodulator 70 holds the preceding output value.

Figure 12:
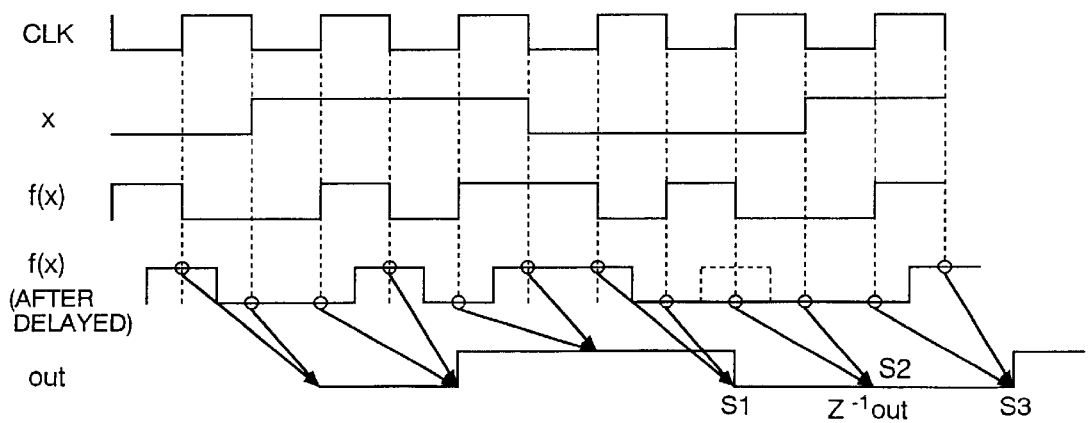
FIG. 12 is a wave form chart showing the signal waveform (when electrical noise is mixed) of each unit in the constitution shown in FIG. 10.

A case in the aforementioned constitution that the signal f(x) indicated by a broken line shown in FIG. 12 is not transmitted due to electrical noise during transmission but the signal f(x) indicated by a solid line is transmitted by mistake will be explained. In the sampling (s1) before the broken line shown in FIG. 12, the transmitted signal f(x) is "High" and "Low", so that the synchronous demodulator 70 outputs 0 ("Low") as output out. In the next sampling (s2), the transmitted signal f(x) is "Low" and "Low", so that the synchronous demodulator 70 outputs the preceding output value, that is, 0 ("Low") as output out. In the next sampling (s3), the transmitted signal f(x) is "Low" and "High", so that the synchronous demodulator 70 outputs 1 ("High") as output out. Even if an error occurs in the signal f(x) transmitted like this, the same output out as that shown in FIG. 11 is obtained.

As mentioned above, even if an error occurs in the transmitted signal f(x) due to electrical noise during transmission, the input signal x can be reproduced without being affected by the error. When an error occurs in f(x) at the timing equivalent to the change point of the input signal x, an error of only the time of one sampling occurs. However, when sampling is executed at a sufficiently high rate compared with the change of the input signal x, the effect of an error can be ignored practically. Even if the isolator in the fourth embodiment inductively couples the primary side and the secondary side using a transformer or optically couples the primary side and the secondary side using a photocoupler, the input signal can be reproduced without being affected by an error in the same way.

Figure 13:
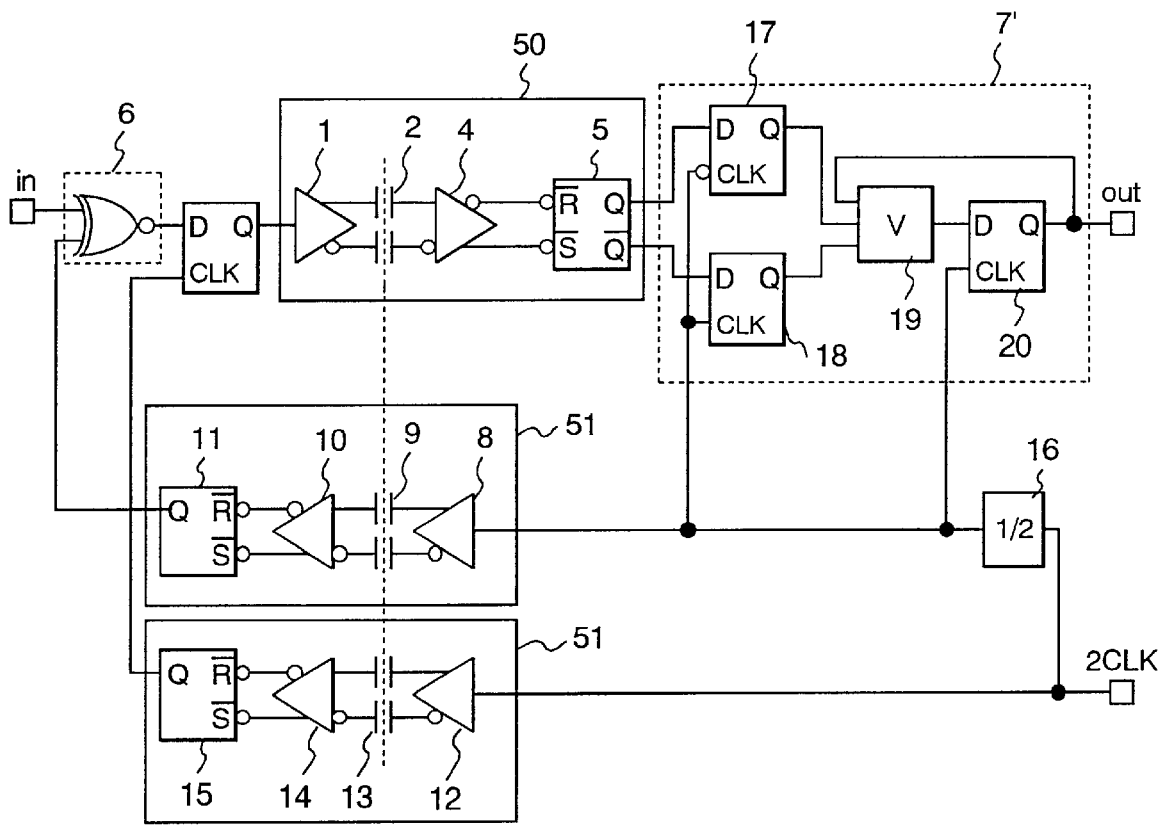
FIG. 13 is a block diagram showing a concrete constitution of FIG. 10.
Figure 14:
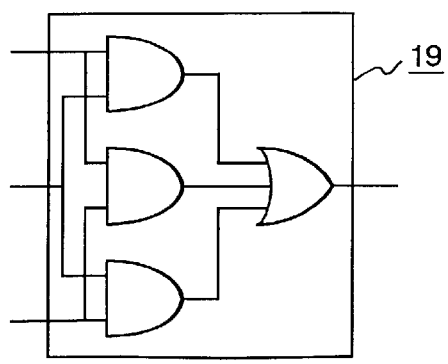
FIG. 14 is a block diagram showing a constitution of a majority circuit.

FIG. 13 shows the constitution shown FIG. 10 more in detail. The D flip-flops 17 and 18 sample f(x) at the leading edge and trailing edge of the clock CLK respectively. The D flip-flops 17 and 18 input the output of the majority circuit 19 to the majority circuit 19 together with the signal sampled by the D flip-flop 20. The circuit feeding back the output of the majority circuit to the input thereof is called a C operator and used as a queuing circuit. When the sampling values of f(x) at the leading edge and trailing edge of the clock CLK are "Low" and "High", both outputs of the D flip-flops 17 and 18 become "High", so that the synchronous demodulator 70 outputs 1 ("High") as output regardless of the feedback value from the D flip-flop 20. When the sampling values of f(x) at the leading edge and trailing edge of the clock CLK are "High" and "Low" in contrast with this, both outputs of the D flip-flops 17 and 18 become "Low", so that the synchronous demodulator 70 outputs 0 ("Low") as output regardless of the feedback value from the D flip-flop 20. In a case other than this, that is, when the sampling values of f(x) at the leading edge and trailing edge of the clock CLK are "High" and "High" or "Low" and "Low", one of the outputs of the D flip-flops 17 and 18 becomes "High" and the other becomes "Low" and the output of the majority circuit 19 holds the same value as the feedback value from the D flip-flop 20, that is, the preceding value. FIG. 14 shows the circuit diagram of the majority circuit 19.

Figure 15:
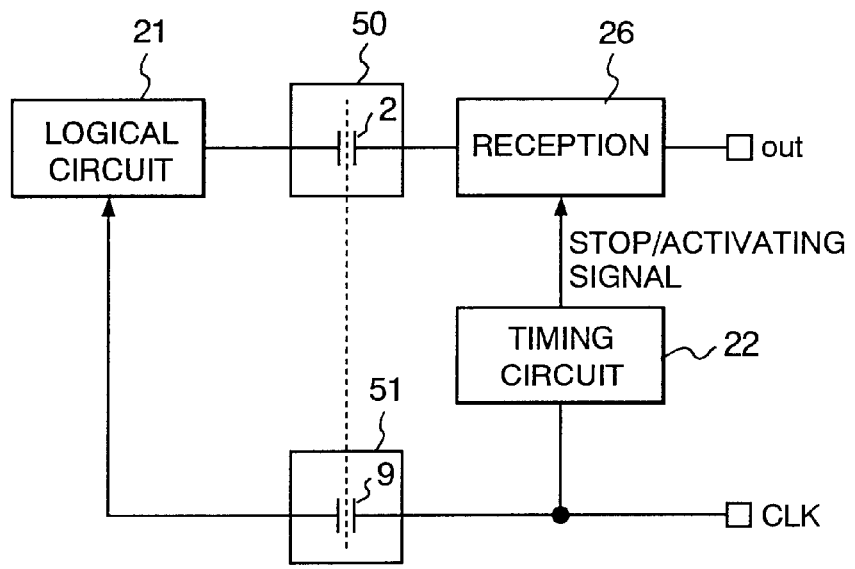
FIG. 15 is a block diagram showing a constitution of synchronization with the clock and stopping of the operation of a receiver.

FIG. 15 shows a constitution that in the fifth embodiment, the primary side outputs the signal to be transmitted in synchronization with the clock and the secondary side operates the receiving function only at the timing that the transmitted signal transfers in synchronization with the clock. Concretely, the receiver 26 receiving the output signal of the logical circuit 21 on the primary side which operates in synchronization with the clock signal CLK and outputs a signal is stopped or activated by the timing signal synchronized with the clock CLK generated by the timing circuit 22.

The clock signal CLK generated on the secondary side is transmitted to the primary side via the isolating capacitor 9 of the isolator 51 and inputted to the logical circuit 21. According to this constitution, the logical circuit 21 operates in synchronization with the clock CLK and outputs a signal, so that the pulse corresponding to the output change of the logical circuit 21 is inputted to the receiver 26 in synchronization with the clock CLK. Therefore, if the receiver 26 is kept stopped at other than the timing that the pulse is inputted to the receiver 26 in synchronization with the clock CLK, it will not be operated by mistake due to electrical noise and the malfunction due to electrical noise can be prevented. Even if the isolator in the fifth embodiment inductively couples the primary side and the secondary side using a transformer or optically couples the primary side and the secondary side using a photocoupler, the apparatus will not be operated by mistake due to electrical noise and the malfunction due to electrical noise can be prevented in the same way.

Figure 16:
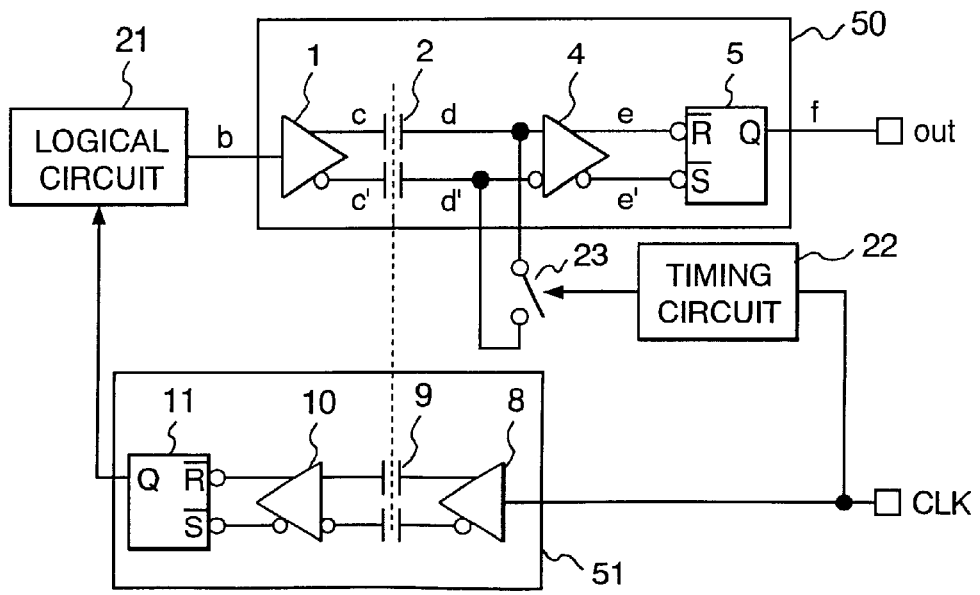
FIG. 16 is a block diagram showing a concrete constitution of FIG. 15.

FIG. 16 shows an example of the concrete constitution of the fifth embodiment. The drawing shows a constitution that the receiver 26 is stopped or activated by short-circuiting or releasing the input terminals of the amplifier 4 in synchronization with the clock signal CLK. The output signal b of the logical circuit 21 on the primary side for operating in synchronization with the clock signal CLK and outputting a signal is amplified by the amplifier 1 having a differential output and the differential output is transmitted to the amplifier 4 having a differential input and differential output on the secondary side via the isolating capacitor 2. The positive and negative differential outputs of the amplifier 4 are inputted to the R and S input terminals of the RS flip-flop 5 respectively. The RS flip-flop 5 reproduces the input signal f. The differential inputs d and d' of the amplifier 4 are connected by a switching element 23 controlled by the timing signal synchronized with the clock CLK generated by the timing circuit 22. Namely, the switching element 23 opens or closes in synchronization with the clock CLK and when it is closed, the differential inputs d and d' of the amplifier 4 are short-circuited, so that the output of the amplifier 4 will not appear and the "High" level is kept. The clock signal CLK generated on the secondary side is amplified by the amplifier 8 having a differential output and the differential output is transmitted to the amplifier 10 having a differential input and differential output on the primary side via the isolating capacitor 9. The positive and negative differential outputs of the amplifier 10 are inputted to the R and S input terminals of the RS flip-flop 11 respectively. The RS flip-flop 11 reproduces the clock signal CLK generated on the secondary side and outputs it to the logical circuit 21. According to this constitution, the logical circuit 21 operates in synchronization with the clock CLK and outputs a signal, so that the pulse corresponding to the output change of the logical circuit 21 appears in the differential inputs d and d' of the amplifier 4 in synchronization with the clock CLK. Therefore, when the switching element 23 is kept closed at other than the timing that a pulse appears in the differential inputs d and d' of the amplifier 4 in synchronization with the clock CLK and d and d' are kept short-circuited, the RS flip-flop 5 on the next stage will not transfer by mistake due to electrical noise caused by the differential inputs d and d' of the amplifier 4 and the malfunction due to electrical noise can be prevented. Needless to say, the switching element 23 can be realized by a semiconductor device such as a transistor.

Figure 17:
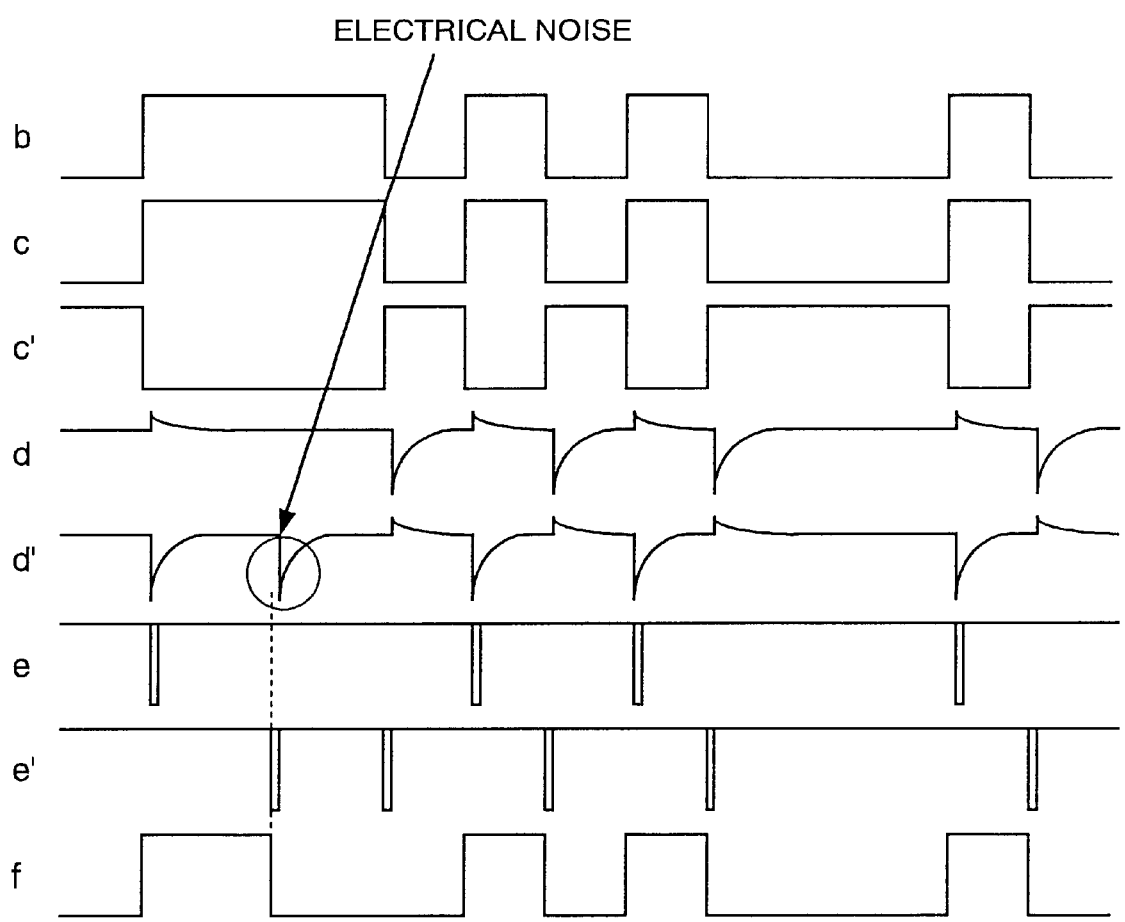
FIG. 17 is a wave form chart showing the signal waveform of each unit when the constitution shown in FIG. 16 is not applied.
Figure 18:
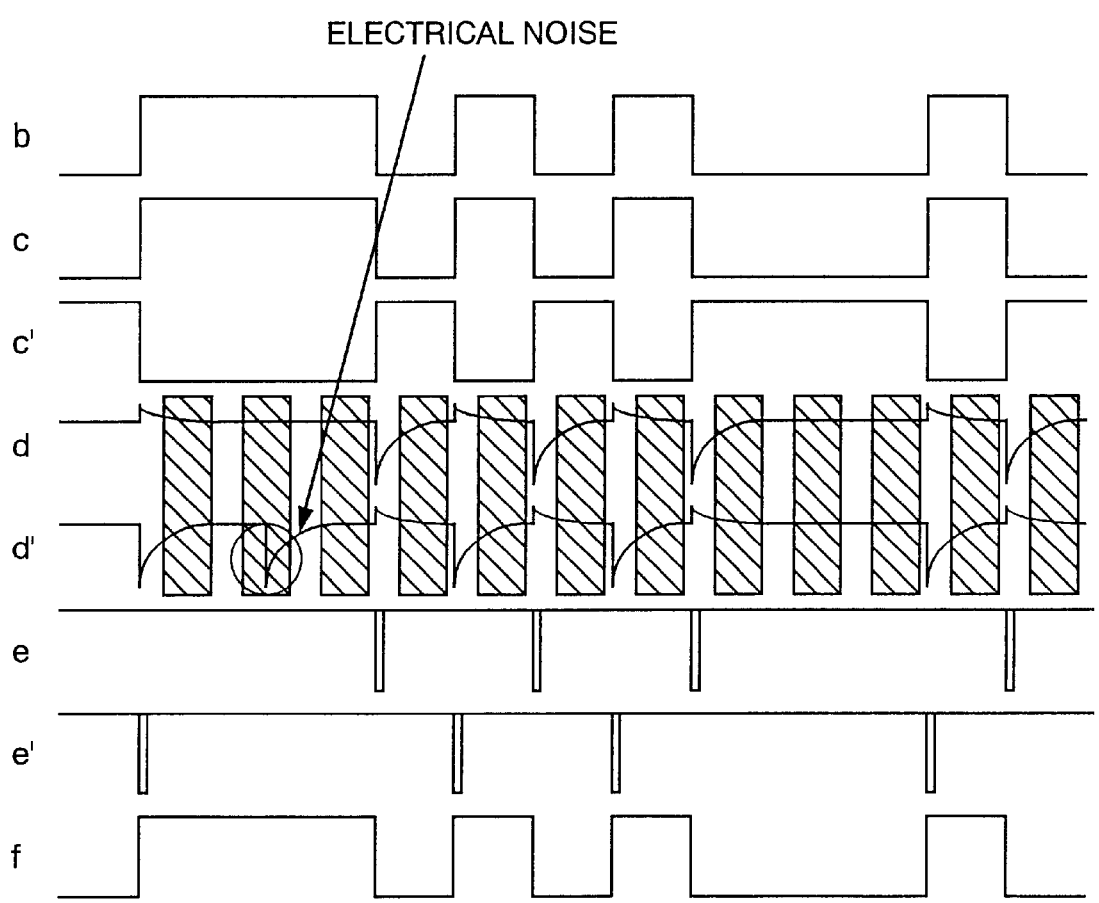
FIG. 18 is a wave form chart showing the signal waveform of each unit when the constitution shown in FIG. 16 is applied.

FIG. 17 shows the signal waveform of each unit when this constitution is not applied and FIG. 18 shows the signal waveform of each unit when this constitution is applied. The detailed operation of each unit is as explained in FIGS. 4 and 5. When this constitution is not used, as shown in FIG. 17, an error occurs in the output "f" of the RS flip-flop 5 due to electrical noise in d'. However, when this constitution is used, as shown in FIG. 17, an error does not occur in the output "f" of the RS flip-flop 5 even if electrical noise is generated in d'.

Figure 19:
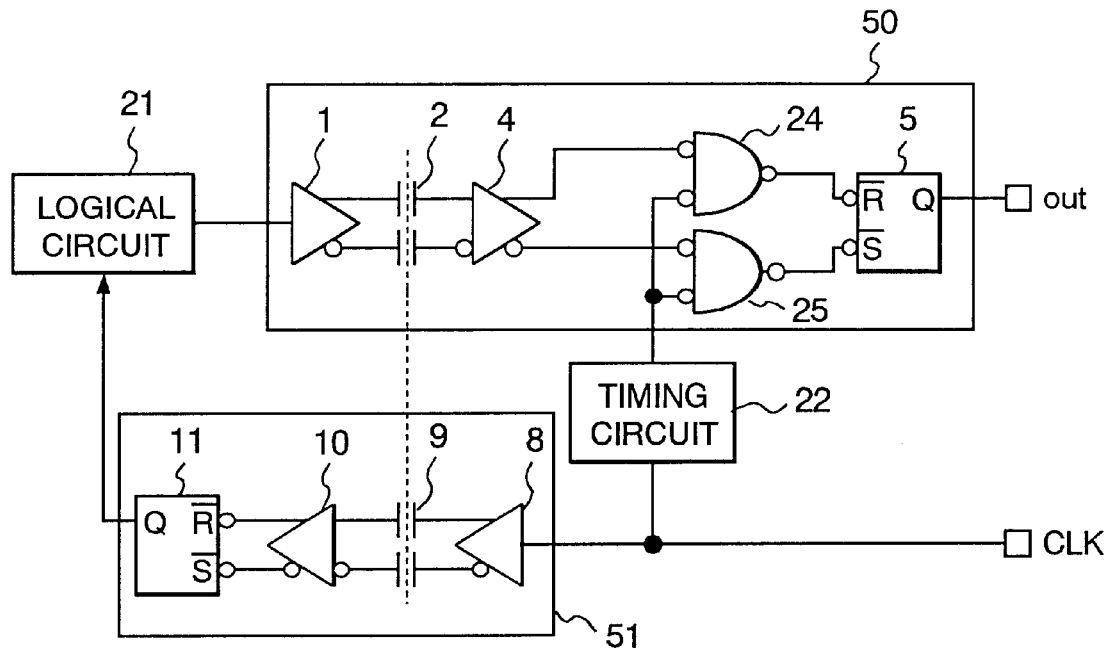
FIG. 19 is a block diagram showing another concrete constitution of FIG. 15.

FIG. 19 shows another constitution of the fifth embodiment. In this constitution, the differential output of the amplifier 4 having a differential input and differential output and the timing signal synchronized with the clock CLK generated by the timing circuit 22 are inputted to the AND circuits 24 and 25 and the outputs of the AND circuits 24 and 25 are inputted to the RS flip-flop 5. According to this constitution, the logical circuit 21 operates in synchronization with the clock CLK and outputs a signal in the same way as with FIG. 16, so that the pulse corresponding to the output change of the logical circuit 21 appears in the differential input and differential output of the amplifier 4 in synchronization with the clock CLK. Therefore, if the output to the RS flip-flop 5 is masked by the AND circuits 24 and 25 at other than the timing that a pulse appears in the differential output of the amplifier 4 in synchronization with the clock CLK, the RS flip-flop 5 will not transfer by mistake due to electrical noise caused by the differential inputs d and d' of the amplifier 4 and the malfunction due to electrical noise can be prevented. The insulating transmission circuit (isolator) for a digital signal has been intensively explained above. However, by pre-installing an A–D (analog to digital) converter before the isolator provided by the present invention or post-installing an D–A (digital to analog) converter behind the isolator, the apparatus may be used for a device for handling an analog signal. When an A–D converter is connected before the isolator and a D–A converter is connected behind the isolator, insulation transmission of an analog signal can be made possible via a digital signal. If an analog signal is converted to a digital signal and insulation-transmitted as mentioned above, signal transmission free of the effect of electrical noise is made possible.

Next, modems to which the aforementioned constitutions are applied will be explained.

Figure 20:
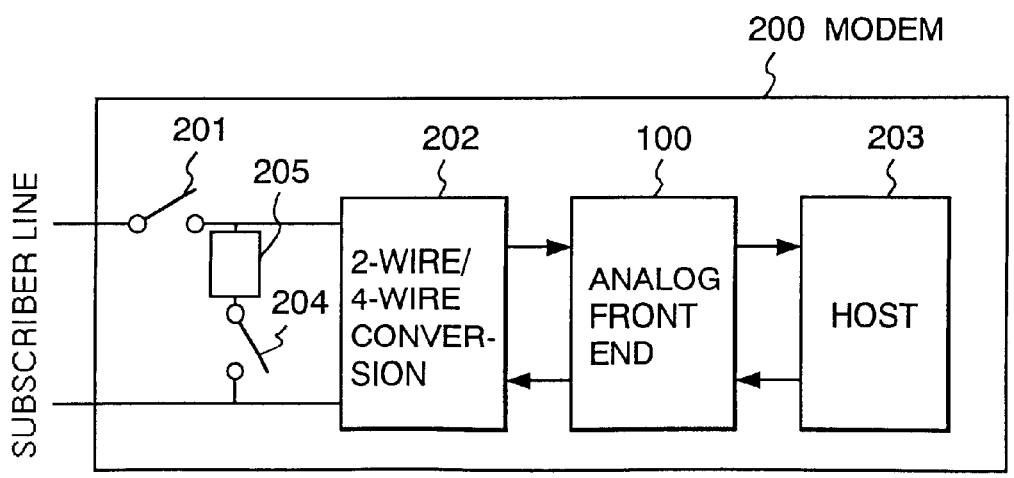
FIG. 20 is a block diagram showing a constitution of a modem.

FIG. 20 shows a constitution of a modem. A switch 204 is a DC blocking switch and notifies an exchange of the off-hook (the receiver is lifted) state by flowing a fixed current in a subscriber line. A switch 201 is a main switch of the modem and particularly when the subscriber line side of an analog front end 100 is to be operated by the DC power supply from the exchange, it is functioned as a power switch. A two-wire to 4-wire converter 202 is a network comprising a Wheatstone bridge for separating a two-way signal between an exchange and the modem by a set of subscriber lines and has a function for reducing the sending signal of the modem mixed in the receiving signal from the exchange. A host 203 executes modulation of a sending signal, demodulation of a receiving signal, filtering, and other necessary processes, outputs a receiving signal outside the modem, and inputs a sending signal from outside the modem and it is realized by a DSP (digital signal processor) or an MPU (microprocessor). The analog front end 100 digitizes the receiving signal sent from the exchange via the subscriber line and outputs it to the host 203 (processor connected to the analog front end, etc.) as a digital signal and analogizes a signal inputted from the host 203 as a digital signal and sends it to the subscriber line as an analog signal. When the modem structured like this, for example, inputs a signal outputted from the host 203 to a computer or a signal outputted from the computer to the host 203, it can be used as a modem for connecting the telephone line and the computer.

Figure 21:
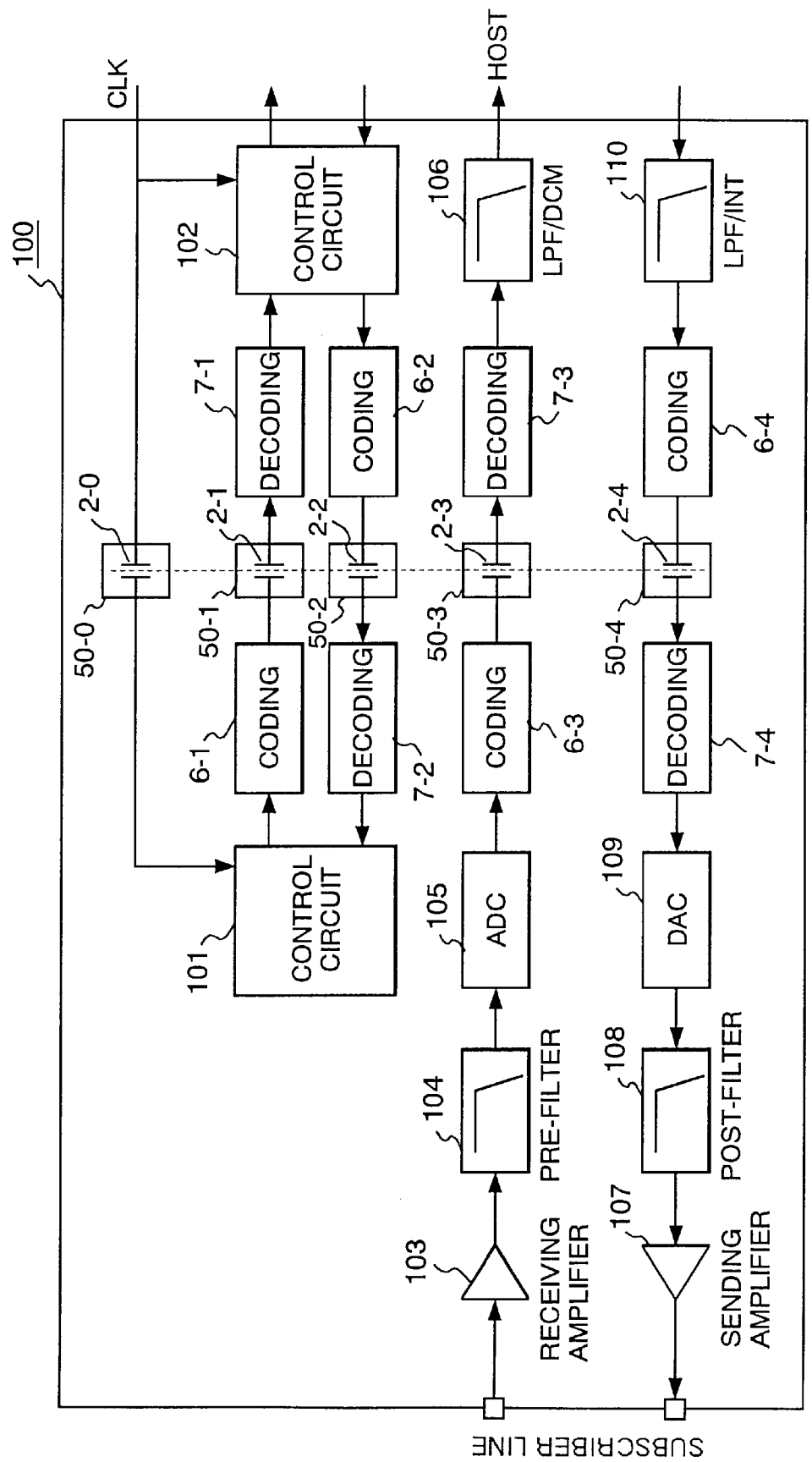
FIG. 21 is a block diagram showing a constitution of a modem analog front end.

FIG. 21 shows a constitution of the analog front end 100 for the modem 200. The clock signal CLK inputted from the host side is transmitted to the subscriber line side via an isolating capacitor 2-0 of an isolator 50-0. Control circuits 101 and 102 exchange information necessary for control (hereinafter called control information) via isolating capacitors 2-1 and 2-2 of isolators 50-1 and 50-2 and control the subscriber line side of the analog front end and the host side respectively. Control information sent from the control circuit 101 to the control circuit 102 includes the operation status (power ON or OFF, error occurrence status) of each unit on the subscriber line side of the analog front end and various informations inputted from the subscriber line side. Control information sent from the control circuit 102 to the control circuit 101 includes the operation mode (over sampling ratio, various test modes) and a signal for controlling the switches (201 and 204 shown in FIG. 20) on the subscriber line side.

Control information from the control circuit 101 is redundancy-coded by a redundancy coder 6-1 and transmitted to the host side via the isolating capacitor 2-1 of the isolator 50-1. The transmitted control information is corrected an error by a decoder 7-1 and inputted to the control circuit 102.

Control information from the control circuit 102 is redundancy-coded by the redundancy coder 6-1, transmitted to the subscriber line side via the isolating capacitor 2-2 of the isolator 50-2, and inputted to the control circuit 101.

The receiving signal sent from the exchange via the subscriber line is subjected to predetermined amplification, gain adjustment, and impedance matching by a receiving amplifier 103, and the component looped back by sampling at more than the Nyquist frequency (½ of the sampling frequency) by a pre-filter 104 is removed, and the signal is digitized by an analog-digital converter (ADC) 105. The digitized signal is redundancy-coded by a redundancy coder 6-3 and transmitted to the region on the host side isolated from the subscriber line side via an isolating capacitor 2-3 of an isolator 50-3. In the region on the host side, an error is corrected by a decoder 7-3. In the oversampling system, furthermore the digital signal is thinned down by a low-pass filter (LPF) and decimeter (DCM) 106 to a signal at a low sampling frequency and outputted to the host (processor connected to the analog front end, etc.).

On the other hand, a sending signal is inputted from the host as a digital signal and in the oversampling system, it is interpolated to a signal at the oversampling frequency by a low-pass filter (LPF) and interpolator 110, redundancy-coded by a redundancy coder 6-4 and transmitted to the region on the subscriber line side isolated from the host side via an isolating capacitor 2-4 of an isolator 50-4. The transmitted control information is corrected an error by a decoder 7-4 and converted to an analog signal by the digital-analog converter (DAC), and unnecessary signal components such as quantizing noise and image noise are eliminated by a post-filter 109, and the signal is sent to the subscriber line by a sending amplifier 107. By use of the aforementioned constitution, the modem may have a built-in insulating function in the LSI so as to eliminate noise by a grounding loop and protect the network equipment and a modem requiring no external parts such as a transformer for insulation can be realized.

Figure 22:
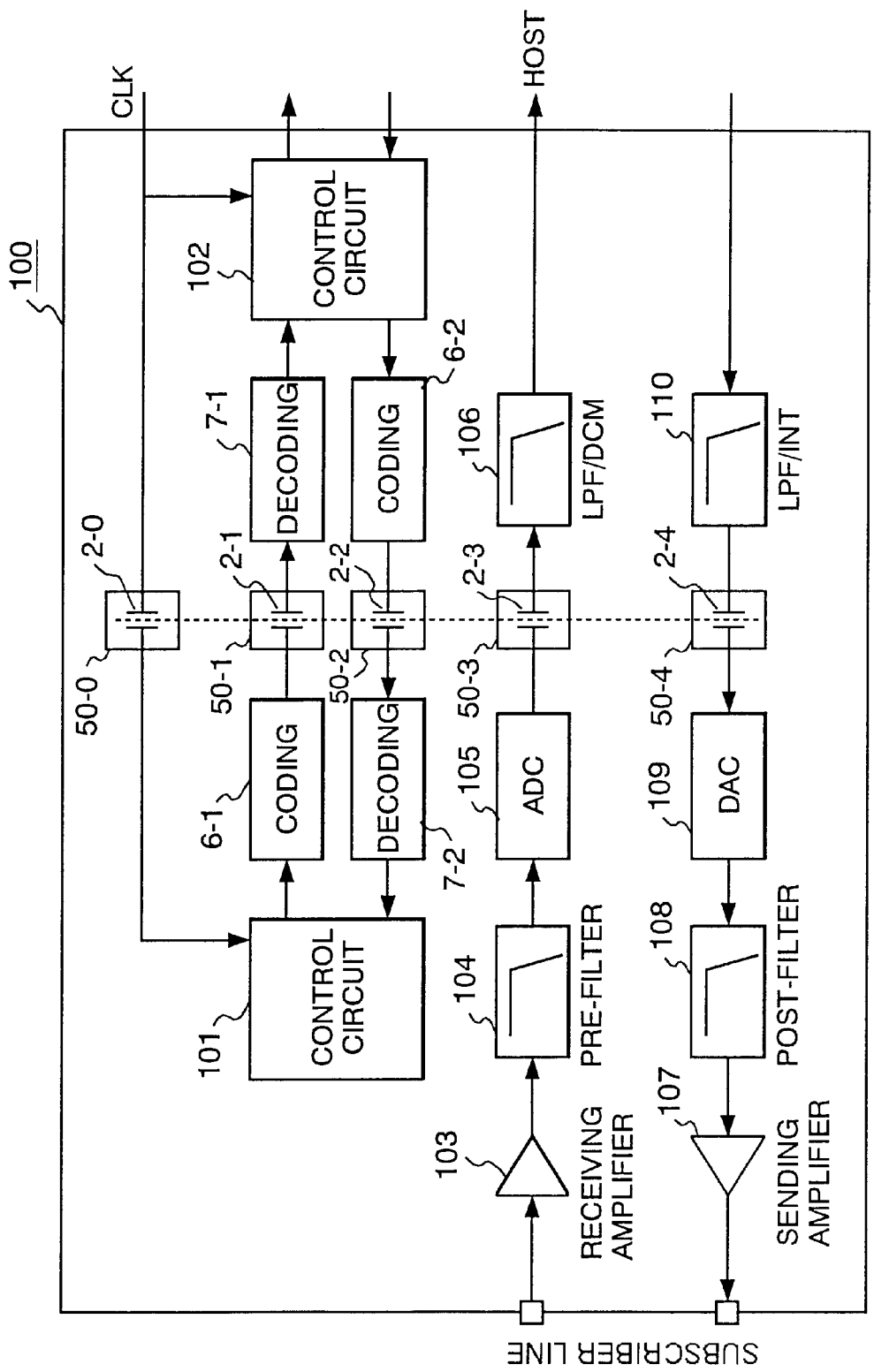
FIG. 22 is a block diagram showing another constitution of a modem analog front end.

Errors of sending and receiving data are limited to transitory ones and furthermore corrected by a protocol, so that if the redundancy coder and decoder are used only to transmit control information as shown in FIG. 22, the effect of the present invention can be produced by a less circuit scale.

If sending and receiving data and control information are switched and transmitted on a time-shared basis by a multiplexers (MUX) 111 and 114 and a demultiplexer (DEMUX) 112, the number of necessary isolators and isolating capacitors thereof can be reduced and the chip size of the analog front end can be reduced.

Figure 24:
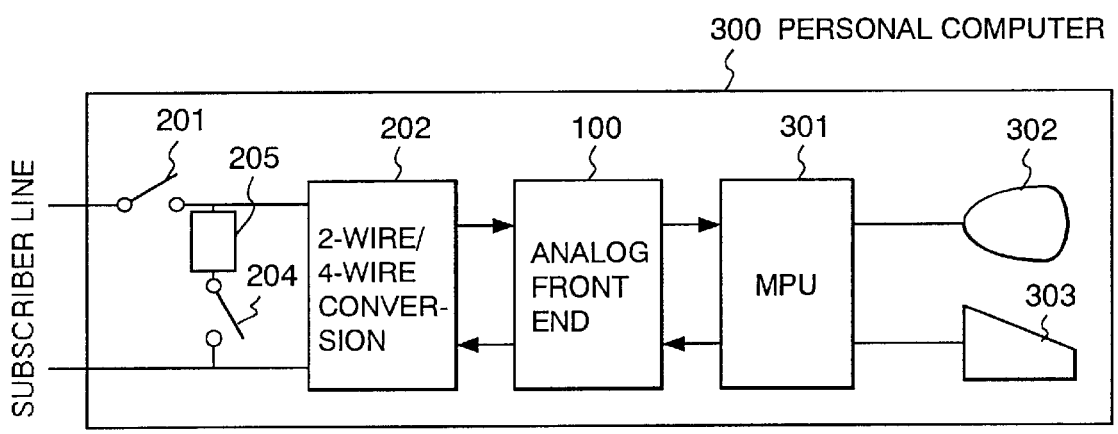
FIG. 24 is a block diagram showing a constitution of a personal computer to which a modem is applied.

FIG. 24 shows a constitution when an MPU (microprocessor) 301 constituting a personal computer plays the role of the host 203 shown in FIG. 20. The personal computer comprises a keyboard 303, a display 302, an MPU 301 for controlling the keyboard 303 and the display 302 and processing data, an analog front end 100, a 2-wire–4-wire converter 202, and switches 201 and 204. The personal computer may be a so-called note type personal computer in which the display 302 is thin like a liquid crystal display and the display 302, the keyboard 303, the MPU 301, and a memory (not shown in the drawing) are integrated. Furthermore, a modem comprising the switches 201 and 204, the 2-wire–4-wire converter 202, and the analog front end 100 may be connected to or built in the personal computer. The switches 201 and 204, the 2-wire–4-wire converter 202, and the analog front end 100 are the same as those explained in FIG. 20. In this constitution, the MPU (microprocessor) 301 processes a signal sent from the analog front end 100 and a signal to be sent to the analog front end 100 using a part of the processing time on a time-shared basis. When the MPU 301 performs the process of the host 203 like this, the apparatus can be miniaturized and is particularly suited to a portable personal computer.

Figure 23:
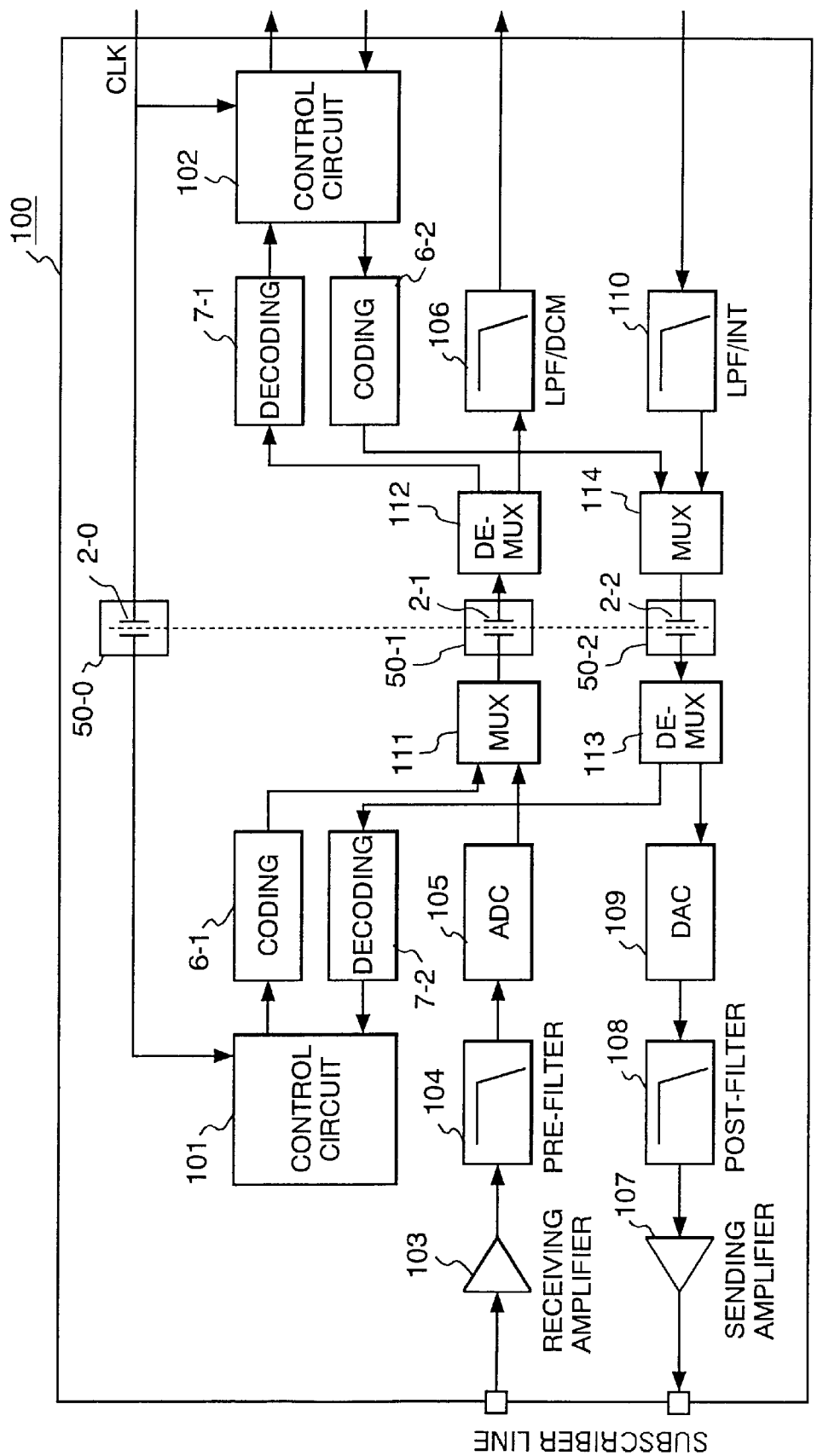
FIG. 23 is a block diagram showing another constitution of a modem analog front end.

In the aforementioned embodiments shown in FIGS. 21 to 23, as an error countermeasure, the redundancy coder for redundancy-coding an input signal, the decoder for decoding a signal redundancy-coded by the redundancy coder, the analog front end comprising an isolator for electrically insulating the redundancy coder and decoder and also transmitting information from the redundancy coder to the decoder, the modem to which the analog front end is applied, and the information processor (personal computer) to which the modem is applied are explained. However, as shown in FIG. 7, even when the modulator for modulating an input signal in synchronization with the clock signal, the demodulator for regenerating the input signal by synchronizing the signal modulated by the modulator with the clock, the analog front end comprising an isolator for electrically insulating the modulator and demodulator and also transmitting a signal from the modulator to the demodulator, the modem to which the analog front end is applied, and the information processor (personal computer) to which the modem is applied are used, a data transmission error caused by electrical noise can be eliminated.

Furthermore, as shown in FIG. 15, even when the signal output device (logical circuit) for outputting a signal in synchronization with the clock signal, the signal receiving device (receiver) for receiving a signal from the signal output device (logical circuit) by the clock signal only for a specific period, the analog front end comprising an isolator for electrically insulating the signal output device (logical circuit) and signal receiving device (receiver) and also transmitting a signal from the signal output device (logical circuit) to the signal receiving device (receiver), the modem to which the analog front end is applied, and the information processor (personal computer) to which the modem is applied are used, a data transmission error caused by electrical noise can be eliminated.

Although the modem is described above, the present invention can be applied not only to the modem but also a communication interface circuit of a network requiring the insulating function. Namely, when a redundancy coder for redundancy-coding an input signal, a decoder for decoding a signal redundancy-coded by the redundancy coder, and a transmission apparatus comprising an isolator for electrically insulating the redundancy coder and decoder and also transmitting a signal from the redundancy coder to the decoder are incorporated into a communication interface for sending and receiving a signal to and from the outside and information is exchanged between the interface and the outside via this transmission apparatus, a data transmission error caused by electrical noise can be eliminated.

Furthermore, as shown in FIG. 7, the transmission apparatus may comprise the modulator for modulating an input signal in synchronization with the clock signal, the demodulator for regenerating the input signal by synchronizing the signal modulated by the modulator with the clock, and the isolator for electrically insulating the modulator and demodulator and also transmitting a signal from the modulator to the demodulator or as shown in FIG. 15, the transmission apparatus may comprise the signal output device (logical circuit) for outputting a signal in synchronization with the clock signal, the signal receiving device (receiver) for receiving a signal from the signal output device (logical circuit) by the clock signal only for a specific period, and the isolator for electrically insulating the signal output device (logical circuit) and signal receiving device (receiver) and also transmitting a signal from the signal output device (logical circuit) to the signal receiving device (receiver).

An isolator used in a modem, information processor, or communication interface may be any of the capacitively coupled type comprising an isolating capacitor, the inductively coupled type comprising a transformer, and the optically coupled type comprising a photocoupler. However, the capacitively coupled isolator comprising an isolating capacitor is excellent in miniaturization and suited to a portable information processor (personal computer) and a modem and communication interface mounted to it.

According to the present invention, an isolator realizing signal transmission which is little affected by mixing of electrical noise and reduces error occurrences can be provided.

What is claimed is:

1. A signal transmission apparatus comprising:
   a redundancy coder for redundancy-coding an input signal, said redundancy coder adding error detection and correction code to the input signal;
   a decoder for decoding a signal redundancy-coded by said redundancy coder; and
   an isolator for electrically insulating said redundancy coder and said decoder and also transmitting information from said redundancy coder to said decoder.

2. A signal transmission apparatus according to claim 1, wherein said isolator has a capacitor for capacitively coupling said redundancy coder and said decoder.

3. A signal transmission apparatus according to claim 2, wherein said capacitor has a first electrode and a second electrode on a semiconductor wafer which are isolated by an insulating band formed by a silicon oxide film.

4. A signal transmission apparatus comprising:
   a redundancy coder for redundancy-coding an input signal;
   a decoder for decoding a signal redundancy-coded by said redundancy coder; and
   an isolator for electrically insulating said redundancy coder and said decoder and also transmitting information from said redundancy coder to said decoder,
   wherein said isolator has a differential amplifier for outputting a signal from said redundancy coder as a complementary signal, a differentiating circuit comprising a capacitor and a resistor for generating a differential signal for each output signal of said differential amplifier, and a regenerative circuit for generating said input signal from each said differential signal generated by said differentiating circuit.

5. A signal transmission apparatus according to claim 4, wherein said capacitor has a first electrode and a second electrode on a semiconductor wafer which are isolated by an insulating band formed by a silicon oxide film.

6. A signal transmission apparatus according to claim 4, wherein said regenerative circuit is an RS flip-flop.

7. A signal transmission apparatus comprising:
   a redundancy coder for redundancy-coding an input signal, said redundancy coder adding error detection and correction code to the input signal;
   a decoder for decoding a signal redundancy-coded by said redundancy coder; and
   an isolator for electrically insulating said redundancy coder and said decoder and also transmitting information from said redundancy coder to said decoder,
   wherein when said inputted signal is a non-coded word, said decoder outputs an already decoded signal.

8. A signal transmission apparatus comprising:
   a redundancy coder for redundancy-coding an input signal, said redundancy coder adding error detection and correction code to the input signal;
   a decoder for decoding a signal redundancy-coded by said redundancy coder; and
   an isolator for electrically insulating said redundancy coder and said decoder and also transmitting information from said redundancy coder to said decoder,
   wherein said redundancy coder, said decoder, and said isolator are formed on the same semiconductor substrate.

9. A signal transmission apparatus comprising
   a redundancy coder for redundancy-coding a digital signal, said redundancy coder adding error detection and correction code to the input signal;
   a decoder for decoding a signal redundancy-coded by said redundancy coder,
   a converter for converting an output of said decoder to an analog signal, and
   an isolator for electrically insulating said redundancy coder and said decoder and also transmitting information from said redundancy coder to said decoder, wherein at least said redundancy coder, said decoder, and said isolator are formed on the same semiconductor substrate.

* * * * *